(12) United States Patent
Carpignano

(10) Patent No.: US 10,422,448 B2
(45) Date of Patent: Sep. 24, 2019

(54) DOUBLE-WALLED PIPE

(71) Applicant: Microtecnica S.r.l., Turin (IT)

(72) Inventor: Claudio Carpignano, Turin (IT)

(73) Assignee: MICROTECNICA S.R.L., Turin (IT)

( * ) Notice: Subject to any disclaimer, the term of this patent is extended or adjusted under 35 U.S.C. 154(b) by 0 days.

(21) Appl. No.: 15/693,697

(22) Filed: Sep. 1, 2017

(65) Prior Publication Data

US 2018/0080582 A1    Mar. 22, 2018

(30) Foreign Application Priority Data

Sep. 1, 2016    (EP) .................... 16425087.0

(51) Int. Cl.
| | | |
|---|---|---|
| *F16L 9/18* | (2006.01) | |
| *F16L 9/19* | (2006.01) | |
| *B22F 5/10* | (2006.01) | |
| *B64D 13/08* | (2006.01) | |
| *B22F 1/00* | (2006.01) | |
| *F28D 7/10* | (2006.01) | |

(Continued)

(52) U.S. Cl.
CPC ............. *F16L 9/19* (2013.01); *B22F 1/00* (2013.01); *B22F 5/106* (2013.01); *B64D 13/08* (2013.01); *F16L 9/18* (2013.01); *F16L 53/32* (2018.01); *F28D 7/106* (2013.01); *F28F 1/124* (2013.01); *F28F 1/36* (2013.01); *B22F 3/105* (2013.01); *B33Y 10/00* (2014.12); *B33Y 80/00* (2014.12); *B64D 13/06* (2013.01); *B64D 2013/0607* (2013.01); *B64D 2013/0625* (2013.01); *F28F 2255/18* (2013.01)

(58) Field of Classification Search
CPC ... F16L 9/18–9/20; F16L 53/32; B33Y 80/00; B29C 64/153; Y02P 10/295; F02C 7/047
USPC ........... 138/112–114, 148; 285/120.1, 123.1; 165/155, 156
See application file for complete search history.

(56) References Cited

U.S. PATENT DOCUMENTS 3,643,733 A * 2/1972 Hall .................. F28D 7/026
                                                        138/32
4,218,999 A * 8/1980 Shearer ................. F02M 31/16
                                                        123/557

(Continued)

FOREIGN PATENT DOCUMENTS

| DE | 8800949 U1 | 3/1988 |
|---|---|---|
| DE | 9004539 U1 | 9/1990 |

(Continued)

OTHER PUBLICATIONS

Extended European Search Report for International Application No. 16425087.0 dated Feb. 28, 2017, 8 pages.

*Primary Examiner* — Patrick F Brinson
(74) *Attorney, Agent, or Firm* — Cantor Colburn LLP

(57) ABSTRACT

A double-walled pipe includes an inner wall, which bounds a flowpath for a first fluid such as air, an outer wall radially spaced from the inner wall so that there is an annular gap between the inner wall and the outer wall; and walls extending in the annular gap between the inner wall and the outer wall, such that flow passages are formed in the annular gap, through which a temperature-controlled fluid can be circulated to control the temperature of the inner wall. The double-walled pipe is formed by an additive manufacturing process. The walls may be helical walls, defining helical flow passages.

11 Claims, 2 Drawing Sheets

(51) Int. Cl.
    *F28F 1/12*          (2006.01)
    *F28F 1/36*          (2006.01)
    *F16L 53/32*        (2018.01)
    *B33Y 10/00*       (2015.01)
    *B33Y 80/00*       (2015.01)
    *B22F 3/105*       (2006.01)
    *B64D 13/06*       (2006.01)

(56) References Cited

U.S. PATENT DOCUMENTS

| | | | | |
|---|---|---|---|---|
| 4,258,782 | A * | 3/1981 | Kao | F28F 1/12 |
| | | | | 138/38 |
| 4,381,819 | A * | 5/1983 | Paolino | F24B 7/005 |
| | | | | 165/122 |
| 4,915,121 | A * | 4/1990 | Rains | F16L 7/00 |
| | | | | 137/15.04 |
| 5,127,441 | A * | 7/1992 | Rains | F16L 7/00 |
| | | | | 138/103 |
| 7,756,404 | B2 * | 7/2010 | Schubert | F28D 7/026 |
| | | | | 392/478 |
| 2014/0305529 | A1 * | 10/2014 | Kroll | F16L 9/19 |
| | | | | 138/111 |
| 2015/0041025 | A1 * | 2/2015 | Wescott | B23K 9/042 |
| | | | | 148/538 |
| 2015/0291291 | A1 | 10/2015 | Regan | |
| 2015/0362898 | A1 * | 12/2015 | Potter | G05B 19/4099 |
| | | | | 700/98 |
| 2016/0003380 | A1 * | 1/2016 | Ott | F02C 7/222 |
| | | | | 138/149 |
| 2016/0160759 | A1 * | 6/2016 | Reynes | F16L 53/32 |
| | | | | 138/32 |
| 2016/0238324 | A1 * | 8/2016 | Butcher | B29D 23/00 |
| 2016/0312924 | A1 * | 10/2016 | Kolarski | F16L 9/18 |
| 2017/0074446 | A1 * | 3/2017 | Sumner | F16L 59/143 |

FOREIGN PATENT DOCUMENTS

| | | |
|---|---|---|
| EP | 2902605 A1 | 8/2015 |
| EP | 2942489 A1 | 11/2015 |
| GB | 1457087 A | 12/1976 |
| GB | 2440546 A | 2/2008 |

\* cited by examiner

DOUBLE-WALLED PIPE

FOREIGN PRIORITY

This application claims priority to European Patent Application No. 16425087.0 filed Sep. 1, 2016, the entire contents of which is incorporated herein by reference.

TECHNICAL FIELD

The present disclosure relates to a double-walled pipe which is particularly suited for use in an aircraft environmental control system.

BACKGROUND

Modern aircraft are routinely provided with environmental control systems (ECS). In civilian aircraft such as airliners, these provide air supply, thermal control and cabin pressurization for the crew and passengers. In military aircraft, the ECS is responsible for cooling of avionics, pressurization and temperature control of the cabin and the crew's suits, windshield defrosting, and sundry other tasks. In both cases, the ECS normally includes tubes and pipework through which fluids such as air are moved.

In certain conditions, the air pipes of an ECS can suffer from icing on their inner surface; that is, the pipes become so cold that any moisture in the air freezes out onto the inner surface of the pipes. This is undesirable, as the ice can break off when the pipe heats up, and the fragments of ice can become entrained in the air flowing through the pipe and cause problems downstream. In addition, the build-up of ice reduces the inner diameter of the pipe, and may reduce the flow of air below acceptable limits. It is thus desirable to maintain the air pipes at temperatures where this problem, and other temperature-related critical conditions, can be avoided.

SUMMARY

There is disclosed herein a double-walled pipe, comprising: an inner wall, which bounds a flowpath for a first fluid; an outer wall radially spaced from the inner wall so that there is an annular gap between the inner wall and the outer wall; and walls extending in the annular gap between the inner wall and the outer wall, such that flow passages are formed in the annular gap, through which a temperature-controlled fluid can be circulated to control the temperature of the inner wall; wherein the double-walled pipe is formed by an additive manufacturing process.

The additive manufacturing process may be a direct metal laser sintering process.

The additive manufacturing process may be an electron beam sintering process.

The additive manufacturing process may be a wire arc additive manufacturing process.

The flow passages may be arranged such that unused material from the additive manufacturing process can be flushed from the flow passages after the double-walled pipe has been formed.

The walls extending in the annular gap may be helical walls, which define helical flow passages.

The walls extending in the annular gap may be formed as a multiplicity of pillars, with flow passages being defined by the gaps between the pillars.

There is also disclosed herein a method for forming a double-walled pipe by an additive manufacturing process, said pipe comprising an inner wall, an outer wall radially spaced from the inner wall so that there is an annular gap between the inner wall and the outer wall, and walls extending in the annular gap between the inner wall and the outer wall, such that the inner wall, the outer wall and the walls extending in the annular gap between the inner wall and the outer wall are integrally formed.

The additive manufacturing process may be a direct metal laser sintering process.

The additive manufacturing process may be an electron beam sintering process.

The additive manufacturing process may be a wire arc additive manufacturing process.

BRIEF DESCRIPTION OF THE DRAWINGS

An exemplary embodiment of the present disclosure will now be described way of example only and with reference to the accompanying Figures, in which.

DETAILED DESCRIPTION

Figure 1:
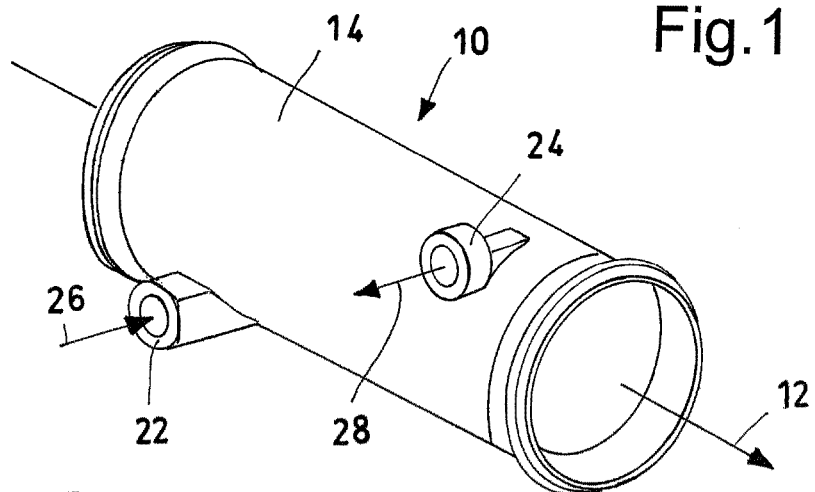
FIG. 1 is a perspective view of a double-walled pipe in accordance with a currently preferred embodiment.

FIG. 1 shows a double-walled pipe 10 suitable for transporting air in an ECS, in situations where the pipe is prone to ice build-up on the inner surface bounding the airflow. The direction of the air flow through the pipe is shown by arrow 12.

The wall 14 of the pipe 10 is hollow, and includes an inner wall 16 and an outer wall 18 radially spaced from the inner wall, so that there is an annular gap 20 between the inner wall 16 and the outer wall 18. A temperature-controlled fluid enters this annular gap through inlet 22, flows in the annular gap 20, and leaves the annular gap 20 through outlet 24, as shown by arrows 26 and 28. As a result, the temperature-controlled fluid can maintain the inner wall 16 at a temperature where ice build-up does not occur.

Figure 2:
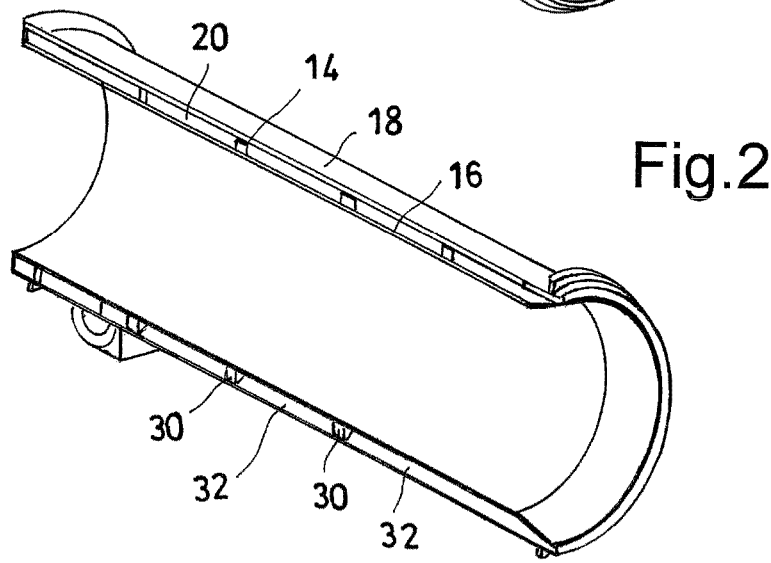
FIG. 2 is a cross-sectional view of the double-walled pipe.
Figure 3:
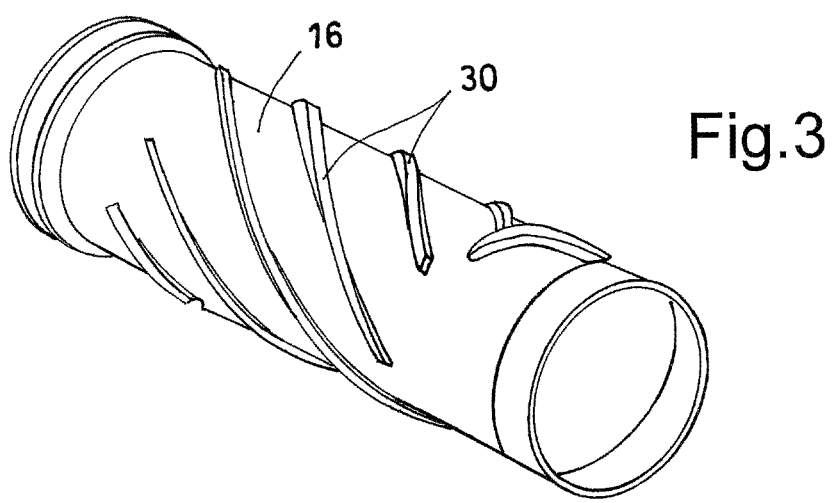
FIG. 3 is a view of the double-walled pipe with the outer wall removed, to show the inner wall.

As shown in FIGS. 2 and 3, the inner wall 16 and the outer wall 18 of the double-walled pipe are connected by helical walls 30, which define helical flow passages 32 for the temperature-controlled fluid. This increases the length between the inlet 22 and the outlet 24, and so increases the residency time of the temperature-controlled fluid in the double-walled pipe 10. Thus, less fluid is required to provide a specific heating effect. The helical flow path for the temperature-controlled fluid also ensures a more uniform distribution of heat, thus ensuring that there no hot or cold spots on the inner wall. In addition, the helical walls 30 increase the strength of the double-walled pipe 10.

Figure 4:
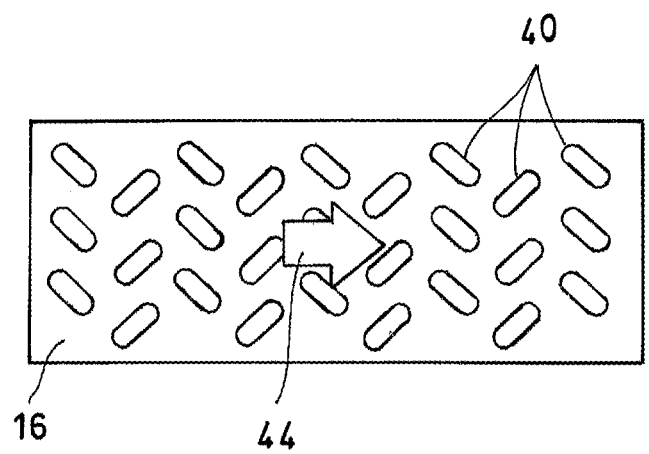
FIG. 4 is a schematic view of the inner wall of an alternative form of double-walled pipe.
Figure 5:
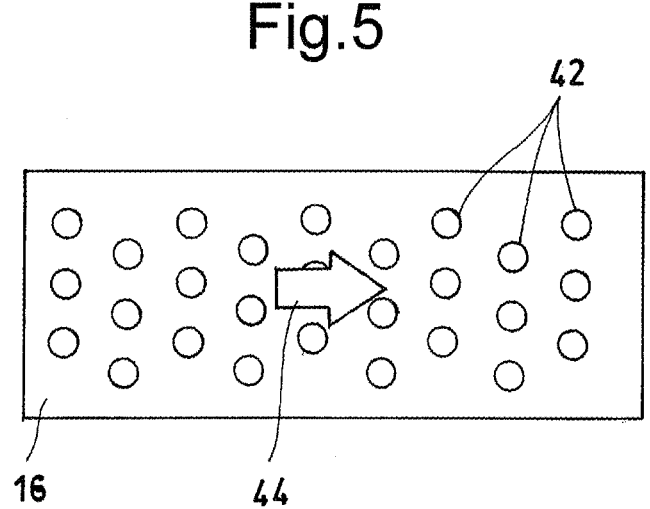
FIG. 5 is a schematic view of the inner wall of another alternative form of double-walled pipe.

Alternative arrangements for the walls connecting the inner wall 16 and the outer wall 18 are shown in FIGS. 4 and 5. In these arrangements, the inner wall 16 and the outer wall 18 are connected by a multiplicity of pillars. The pillars 40 in the embodiment of FIG. 4 have an elongate cross-section, and the pillars 42 in the embodiment of FIG. 5 have a circular cross-section. The pillars are offset from each other so that intricate flow paths are formed around the pillars; the general direction of flow from the inlet 22 to the outlet 24 is shown by arrow 44, and it will be seen that the fluid takes a circuitous route around the pillars in order to move from the inlet to the outlet.

The arrangements of FIGS. 4 and 5 provide similar advantages to the helical walls shown in FIG. 3. In particular, they increase the residency time of the temperature-controlled fluid, provide a more uniform distribution of heat, and increase the strength of the pipe.

The inner wall 16, outer wall 18 and helical walls 30 (or pillars 40, 42) are formed integrally using an additive manufacturing process (commonly referred to as "3D printing"). It is particularly preferred for the inner wall 16, outer wall 18 and helical walls 30 or pillars 40, 42 to be formed integrally using a direct metal laser sintering (DMLS) process; this process is also referred to as DLMS. The inner wall 16, outer wall 18 and helical walls 30 or pillars 40, 42 can also be formed by electron beam sintering, wire arc additive manufacturing (WAAM), or by any other suitable form of additive manufacturing process.

The helical walls 30 are arranged such that any unused material from the additive manufacturing process (such as unmelted or unsintered powder) can be flushed from the helical flow passages 32 after the double-walled pipe has been formed and before it is installed in an ECS. This ensures that the temperature-controlled fluid flowing in the helical flow passages is not contaminated by the unused material. This can be achieved by ensuring that there are no pockets where unused material could become trapped, and no narrow regions where the unused material could clump together and block the helical flow passages.

Similarly, if pillars 40, 42 are used instead of helical walls, the pillars 40, 42 are arranged so that the regions between adjacent pillars (which define the intricate flow paths) are sufficiently large that unused material cannot clump together and block the flow paths.

The use of an additive manufacturing process allows the double-walled pipe 10 to be easily formed with an intricate geometry. If the double-walled pipe were to be made using traditional manufacturing methods, for example by fitting an inner pipe over an outer pipe, then this would weaken the overall structure; further, it would be extremely difficult to ensure that the helical walls or pillars were joined to both the inner and outer walls, and thus ensure correct flow of the temperature-controlled fluid. Similarly, casting the double-walled pipe would require the use of a sacrificial core, which would increase costs, as well as increasing the number of steps required for manufacturing the double-walled pipe.

Further, the use of an additive manufacturing process allows the double-walled pipe to be made at low cost, as the only material used in the process is that which actually forms the double-walled pipe. Unused material (such as that flushed from the flow passages after the pipe is formed) can be recovered and used in a subsequent pipe-forming process. In addition, as no special tooling is required, the production cost can be further reduced, and there is also a reduced lead time in production.

The weight of the pipe can also be reduced, as the design can be optimized to include as little material as possible, which is clearly advantageous in aerospace applications.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. An environmental control system comprising:
   a double-walled pipe (10) for transporting air; and
   a temperature-controlled fluid for avoiding ice build-up within the double-walled pipe;
   wherein the double-walled pipe includes:
   an inner wall, which bounds a flowpath for the air;
   an outer wall radially spaced from the inner wall so that there is an annular gap between the inner wall and the outer wall; and
   walls extending in the annular gap between the inner wall and the outer wall, such that flow passages are formed in the annular gap, through which, in use, the temperature-controlled fluid is circulated to control the temperature of the inner wall;
   wherein the double-walled pipe is formed by an additive manufacturing process.

2. An environmental control system as claimed in claim 1, wherein the additive manufacturing process is a direct metal laser sintering process.

3. An environmental control system as claimed in claim 1, wherein the additive manufacturing process is an electron beam sintering process.

4. An environmental control system as claimed in claim 1, wherein the additive manufacturing process is a wire arc additive manufacturing process.

5. An environmental control system as claimed in claim 1, wherein the flow passages are arranged such that unused material from the additive manufacturing process can be flushed from the flow passages after the double-walled pipe has been formed.

6. An environmental control system as claimed in claim 1, wherein the walls extending in the annular gap are helical walls, which define helical flow passages.

7. An environmental control system as claimed in claim 1, wherein the walls extending in the annular gap are formed as a multiplicity of pillars, with flow passages being defined by the gaps between the pillars.

8. An environmental control system as claimed in claim 2, wherein the walls extending in the annular gap are formed as a multiplicity of pillars, with flow passages being defined by the gaps between the pillars.

9. An environmental control system as claimed in claim 3, wherein the walls extending in the annular gap are formed as a multiplicity of pillars, with flow passages being defined by the gaps between the pillars.

10. An environmental control system as claimed in claim 4, wherein the walls extending in the annular gap are formed as a multiplicity of pillars, with flow passages being defined by the gaps between the pillars.

11. An environmental control system as claimed in claim 5, wherein the walls extending in the annular gap are formed as a multiplicity of pillars, with flow passages being defined by the gaps between the pillars.

* * * * *